(12) United States Patent
Tsai et al.

(10) Patent No.: US 10,663,831 B2
(45) Date of Patent: May 26, 2020

(54) METHOD FOR MAKING A CURVED ELECTROCHROMIC FILM

(71) Applicant: TINTABLE KIBING CO., LTD., Tainan (TW)

(72) Inventors: Fu-Yu Tsai, Tainan (TW); Keng-Ming Hu, Tainan (TW); Jui-Wen Tsai, Tainan (TW); Yau-Ren Yang, Tainan (TW); Yi-Wen Chung, Tainan (TW)

(73) Assignee: TINTABLE KIBING CO., LTD., Tainan (TW)

( * ) Notice: Subject to any disclaimer, the term of this patent is extended or adjusted under 35 U.S.C. 154(b) by 83 days.

(21) Appl. No.: 15/994,722

(22) Filed: May 31, 2018

(65) Prior Publication Data

US 2019/0163026 A1    May 30, 2019

(30) Foreign Application Priority Data

Nov. 29, 2017   (TW) .............................. 106141598 A

(51) Int. Cl.
| | | |
|---|---|---|
| *G02F 1/1523* | (2019.01) | |
| *G02F 1/153* | (2006.01) | |
| *B29C 53/04* | (2006.01) | |
| *B29C 65/00* | (2006.01) | |
| *C09K 9/00* | (2006.01) | |
| *B32B 37/12* | (2006.01) | |

(52) U.S. Cl.
CPC ............ *G02F 1/1525* (2013.01); *B29C 53/04* (2013.01); *B29C 66/836* (2013.01); *C09K 9/00* (2013.01); *G02F 1/153* (2013.01); *B32B 2037/1253* (2013.01)

(58) Field of Classification Search
None
See application file for complete search history.

(56) References Cited

U.S. PATENT DOCUMENTS

| | | | | |
|---|---|---|---|---|
| 6,172,794 B1* | 1/2001 | Burdis | ................... | G02F 1/1523 |
| | | | | 359/267 |
| 2016/0009068 A1* | 1/2016 | Garner | ................ | B32B 38/0012 |
| | | | | 156/196 |

FOREIGN PATENT DOCUMENTS

TW         201438895 A       10/2014

OTHER PUBLICATIONS

Search Report appended to an Office Action issued to Taiwanese counterpart application No. 106141598 by the TIPO dated Jul. 20, 2018.

* cited by examiner

*Primary Examiner* — Barbara J Musser
(74) *Attorney, Agent, or Firm* — DLA Piper LLP (US)

(57) ABSTRACT

A method of making a curved electrochromic film includes: disposing a UV curable adhesive layer between a first electrochromic member and a second electrochromic member to form an electrochromic film semi-product in flat form; arching the electrochromic film semi-product between the first and second bending members of a forming apparatus and by moving the first and second bending members toward each other; and curing the UV curable adhesive layer using a UV light source while the electrochromic film semi-product is arched. Forming apparatuses for forming a flat electrochromic film semi-product into a curved electrochromic film are also disclosed.

4 Claims, 5 Drawing Sheets

METHOD FOR MAKING A CURVED ELECTROCHROMIC FILM

CROSS-REFERENCE TO RELATED APPLICATION

This application claims priority of Taiwanese Invention Patent Application No. 106141598, filed on Nov. 29, 2017.

FIELD

The disclosure relates to a method and a forming apparatus for making an electrochromic film, and more particularly to a method of making a curved electrochromic film and forming apparatuses for forming a flat electrochromic film semi-product into a curved electrochromic film.

BACKGROUND

A conventional electrochromic film generally includes two electrochromic units, and an adhesive layer connected therebetween. The manufacturing of the electrochromic film begins with formation of the electrochromic units. One of the electrochromic units includes a substrate, a transparent electrically conductive layer, and an electrochromic layer laminated upon one another in that order. The other one of the electrochromic units includes a substrate, a transparent electrically conductive layer, and an ion storage layer laminated upon one another in that order. Then the adhesive layer is disposed and cured between the electrochromic layer and the ion storage layer of the electrochromic units. The resulting electrochromic film may be subjected to subsequent processes, such as cutting, electrode-forming, activating, cleaning, etc., so as to form the electrochromic film in flat form.

In usage, the electrochromic film is frequently attached to a curved substrate, such as a curved lens. For secure adhesion of the electrochromic film to the curved substrate, the electrochromic film is forcibly bent after curing by applying an external force so as to conform to the contour of the curved substrate. However, the aforementioned post-curing bending process cannot afford satisfying bonding strength between the electrochromic film and the curved substrate, and tends to generate relatively large inner stress of the electrochromic film, which results in separation of the two electrochromic units from each other.

SUMMARY

Therefore, an object of the disclosure is to provide a method of making a curved electrochromic film and forming apparatuses for forming a flat electrochromic film semi-product into a curved electrochromic film, which can alleviate at least one of the drawbacks of the prior art.

According to one aspect of the disclosure, a method of making a curved electrochromic film includes: disposing an ultraviolet (UV) curable adhesive layer between a first electrochromic member and a second electrochromic member to form an electrochromic film semi-product in flat form; arching the electrochromic film semi-product by placing the electrochromic film semi-product between first and second bending members of a forming apparatus and by moving the first and second bending members toward each other; and curing the UV curable adhesive layer using a UV light source.

According to another aspect of the disclosure, a forming apparatus for forming a flat electrochromic film semi-product into a curved electrochromic film includes a base and a bending unit.

The base is adapted for placement of the electrochromic film semi-product.

The bending unit is disposed on the base and includes a first bending member and a second bending member that is spaced apart from the first bending member so as to allow the electrochromic film semi-product to lie on the base therebetween.

The first bending member is reciprocally movable toward and away from the second bending member along directions that are parallel to a direction in which the electrochromic film semi-product lies on the base, and the first bending member causes the electrochromic film semi-product to arch when moving toward the second bending member.

According to yet another aspect of the disclosure, a forming apparatus for forming a flat electrochromic film semi-product into a curved electrochromic film includes a first bending member and a second bending member.

The second bending member is spaced apart from the first bending member so as to allow the electrochromic film semi-product to be disposed therebetween.

The second bending member is reciprocally movable toward and away from the first bending member along directions that are perpendicular to a direction in which the electrochromic film semi-product lies between the first and second bending member so as to bend and press the electrochromic film semi-product against the first bending member.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
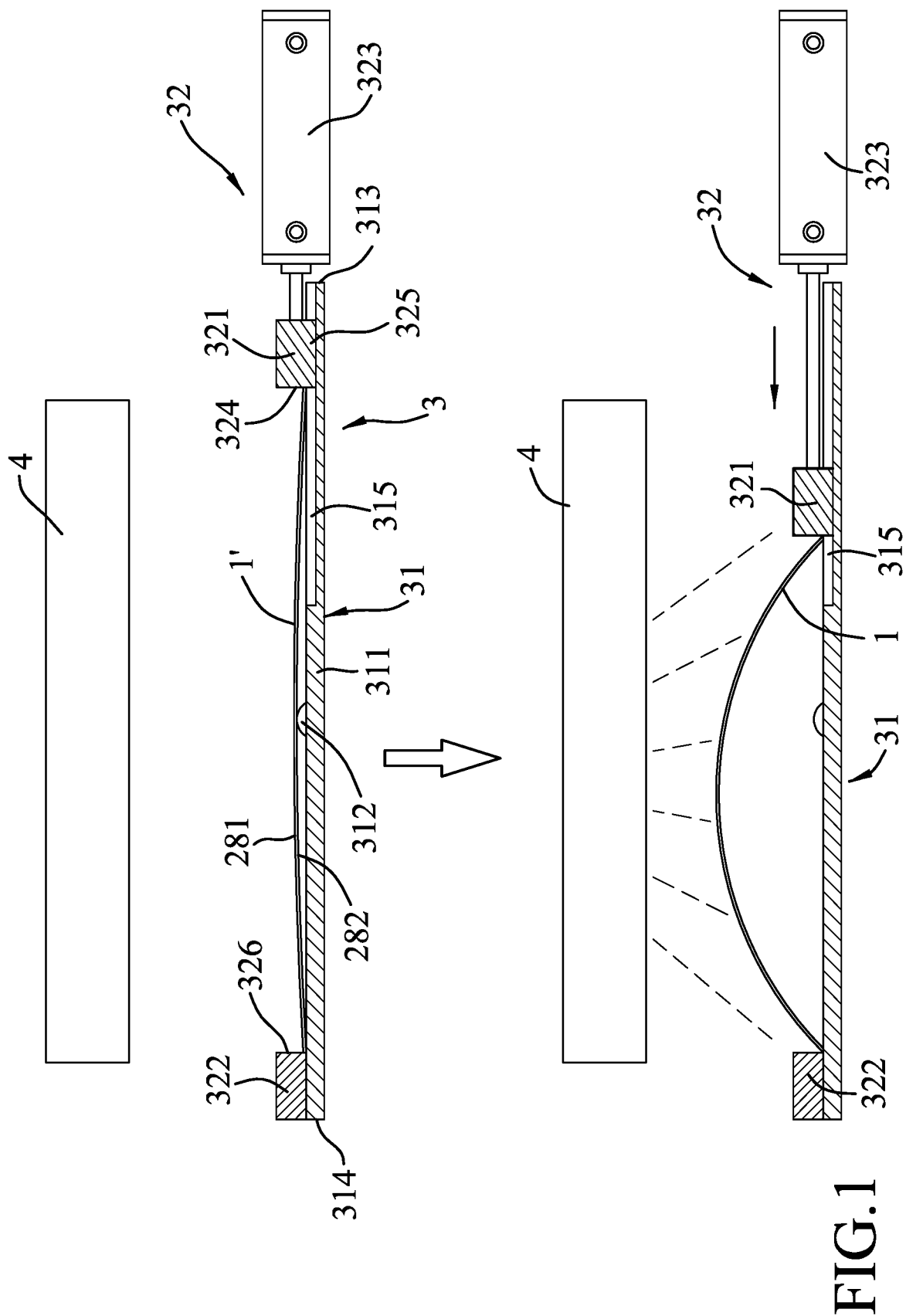
FIG. 1 is a schematic view illustrating arching and curing of an electrochromic film semi-product of an embodiment of a method of making a curved electrochromic film in cooperation with a first embodiment of a forming apparatus according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
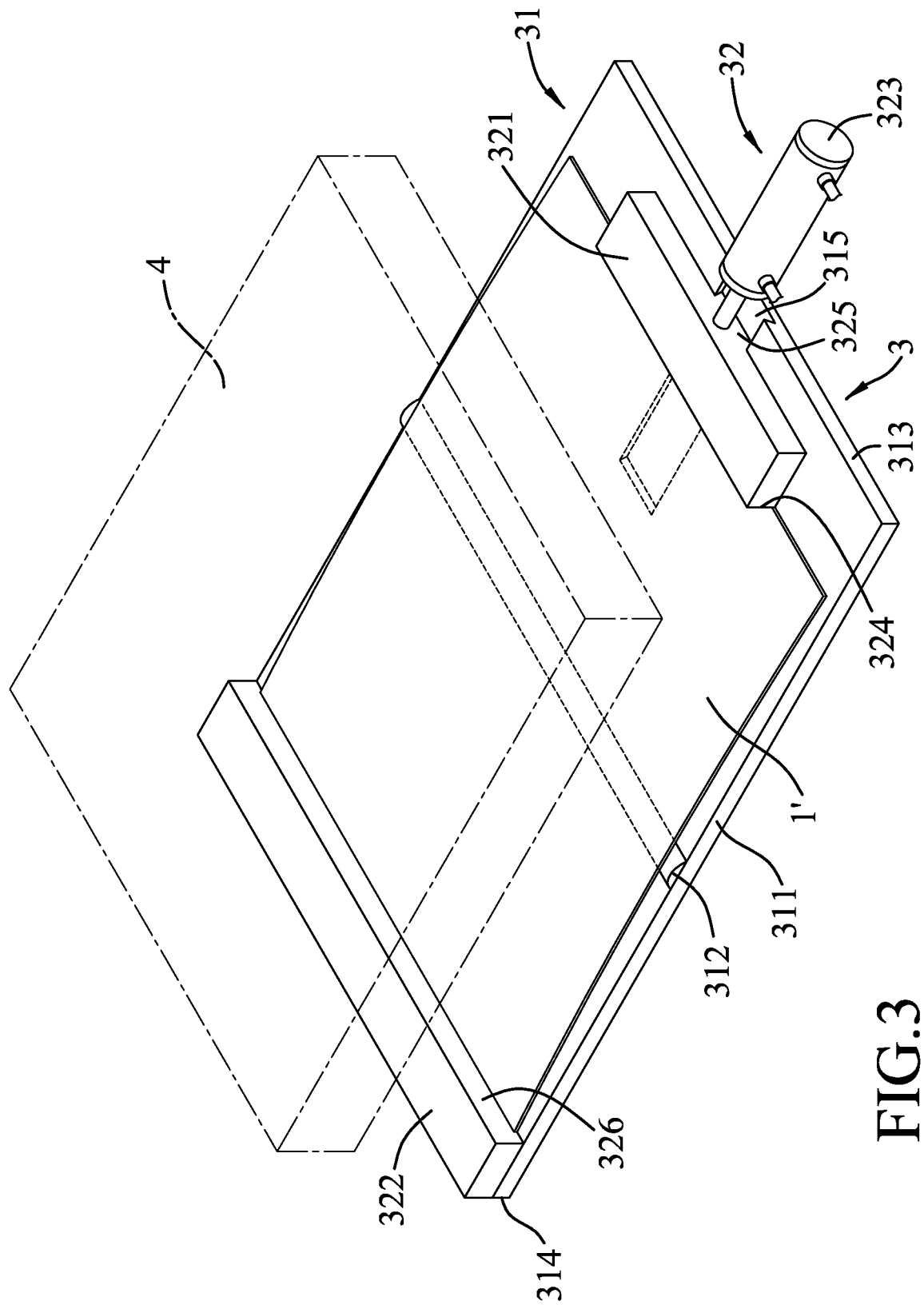
FIG. 3 is a perspective view illustrating the first embodiment of the forming apparatus of FIG. 1.

Referring to FIGS. 1 and 3, an embodiment of a method of making a curved electrochromic film 1, which is adapted to be attached to a curved substrate, such as a curved lens (not shown) is carried out in cooperation with a first embodiment of a forming apparatus 3 and a ultraviolet (UV) light source 4.

The first embodiment of the forming apparatus 3 for forming a flat electrochromic film semi-product 1' into the curved electrochromic film 1 includes a base 31 for placement of the flat electrochromic film semi-product 1', and a bending unit 32 disposed on the base 31. In this embodiment of the forming apparatus 3, the base 31 is shaped into a plate. In one form, the base 31 may have a structure composed of a plurality of interconnected rods. The base 31 includes a base plate 311, and a reverse-bending resistant portion 312 that is supported by the base plate 311. The base plate 311 includes a first side 313, a second side 314 parallel to and spaced apart from the first side 313, and a confining groove 315 that extends from the first side 313 toward the second side 314.

The bending unit 32 includes a first bending member 321 and a second bending member 322 that is spaced apart from the first bending member 321 so as to allow the electrochromic film semi-product 1' to lie on the base 31 and between the first and second bending members 321, 322. The first bending member 321 is reciprocally movable toward and away from the second bending member 322 along directions that are parallel to a direction in which the electrochromic film semi-product 1' lies on said base 31. In this embodiment, the first bending member 321 is adjacent to the first side 313 of the base plate 311. The second bending member 322 is fixedly disposed on the base plate 311 and adjacent to the second side 314 of the base plate 311. The first bending member 321 causes the electrochromic film semi-product 1' to arch when moving toward the second bending member 322. In this embodiment of the forming apparatus 3, the bending unit 32 further includes a power source 323 for driving the first bending member 321 to reciprocally move toward and away from the second bending member 322 so as to adjust a distance between the first and second bending members 321, 322. The reverse-bending resistant portion 312 is disposed between the first and second bending members 321, 322. In other words, the first and second bending members 321, 322 are disposed on the base plate 311 at two opposite sides of the reverse-bending resistant portion 312 that is supported by the base plate 311. The reverse-bending resistant portion 312 is adapted to cause a middle part of the electrochromic film semi-product 1' to arch on the base 31. The first bending member 321 has a first abutting surface 324 and a confined portion 325 that is received in and guided by the confining groove 315 for reciprocal movements of the first bending member 321. The second bending member 322 has a second abutting surface 326 that is opposite to and parallel to the first abutting surface 324. Types and structures of the power source 323 are not limited. In this embodiment of the forming apparatus 3, the power source 323 is a pneumatic cylinder. The UV light source 4 is disposed over the base plate 311 and substantially between the first and second bending members 321, 322.

The embodiment of the method of making the curved electrochromic film 1 according to the disclosure in cooperation with the first embodiment of the forming apparatus 3 includes the following Steps S01 to S03.

Figure 2:
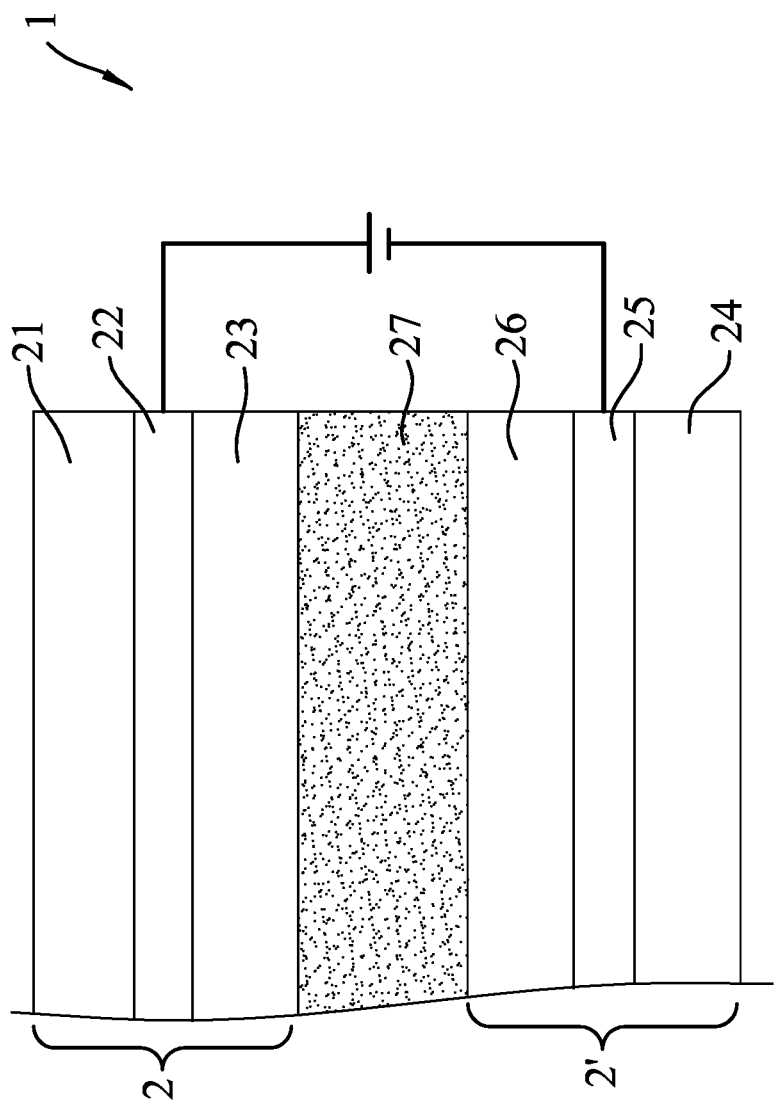
FIG. 2 is a fragmentary side view illustrating formation of the electrochromic film semi-product of the embodiment of the method of FIG. 1.

Referring to FIG. 2, in Step S01, a UV curable adhesive layer 27 is disposed between a first electrochromic member 2 and a second electrochromic member 2' to form the electrochromic film semi-product 1' in flat form. The first electrochromic member 2 is exemplified to include a first substrate 21, a first transparent conductive layer 22 attached to one side of the first substrate 21, and an ion storage layer 23 attached to another side of the first transparent conductive layer 22 that is opposite to the first substrate 21. The second electrochromic member 2' includes a second substrate 24 that has an area substantially the same as that of the first substrate 21, a second transparent conductive layer 25 attached to one side of the second substrate 24, and an electrochromic layer 26 attached to another side of the second transparent conductive layer 25 that is opposite to the second substrate 24. The electrochromic layer 26 of the second electrochromic member 2' faces toward the ion storage layer 23 of the first electrochromic member 2. In one embodiment, the first electrochromic member 2 may be free of the ion storage layer 23.

In this embodiment of the method, each of the first and the second substrates 21, 24 is made from a transparent plastic material. For example, the transparent plastic material may be a polycarbonate-based material with anti-fog property and a relatively high structural strength. When mass manufacturing of the first and second electrochromic members 2, 2' are intended, a plurality of the first and second transparent conductive layers 22, 25 are first respectively disposed on a substrate having a relatively large area, and then the substrate are singularized by cutting to form a plurality of the first substrates 21, each of which is formed with a respective one of the first transparent conductive layers 22, and a plurality of the second substrates 24, each of which is formed with a respective one of the second transparent conductive layers 25. Subsequently, a plurality of the ion storage layers 23 are respectively deposited on the first transparent conductive layers 22 formed on the singularized first substrates 21, and a plurality of the electrochromic layers 26 are respectively deposited on the second transparent conductive layers 25 formed on the singularized second substrates 24. The ion storage layer 23 may be made from nickel oxide, and the electrochromic layer 26 may be made from an electrochromic material selected from the group consisting of tungsten(III) oxide ($W_2O_3$), nickel oxide (NiO), vanadium pentoxide ($V_2O_5$), and combinations thereof.

Referring to FIG. 2 again, the UV curable adhesive layer 27 is coated on one of the ion storage layer 23 of the first electrochromic member 2 and the electrochromic layer 26 of the second electrochromic member 2', and then the ion storage layer 23 of the first electrochromic member 2 and the electrochromic layer 26 of the second electrochromic member 2' are attached to each other through the UV curable adhesive layer 27 to form the flat electrochromic film semi-product 1'.

In Step S02, the electrochromic film semi-product 1' is arched by placing the electrochromic film semi-product 1' between the first and second bending members 321, 322 of the forming apparatus 3 of the disclosure and by moving the first and second bending members 321, 322 toward each other. More specifically, the electrochromic film semi-product 1' is placed on the base plate 311, and the first and second bending members 321, 322 are moved toward each other along directions that are parallel to a direction in which the electrochromic film semi-product 1' lies between the first and second bending members 321, 322. In this embodiment, when the first and second bending members 321, 322 are moved toward each other, the first and second bending members 321, 322 respectively push two opposites parts of a periphery 11 of the electrochromic film semi-product 1' toward each other with the first and second abutting surfaces 324, 326 such that the electrochromic film semi-product 1' is arched midway between the two opposite parts. Further-more, since the two opposite parts of the electrochromic film semi-product 1' placed on the base 31 are abutted against the first and second abutting surfaces 324, 326 of the first and second bending members 321, 322 and since the reverse-bending resistant portion 312 is located under the electrochromic film semi-product 1', the middle part of the electrochromic film semi-product 1' is urged to be arched away from the base 31.

In Step S03, the UV curable adhesive layer 27 is cured using the UV light source 4. Step S02 and Step S03 may be simultaneously or sequentially carried out.

To be specific, when the power source 323 drives the first bending member 321 to move toward the second bending member 322, the distance between the first and second bending members 321, 322 will be reduced, and thus the electrochromic film semi-product 1' will be arched. When the electrochromic film semi-product 1' has achieved a predetermined curvature, the power source 323 will stop driving the first bending member 321. That is to say, the curvature of the electrochromic film semi-product 1' is adjustable by changing the amount of movement of the first bending member 321, i.e., the distance between the first and second bending members 321, 322.

The arched electrochromic film semi-product 1' has a convex surface 281 and a concave surface 282 opposite to the convex surface 281. Step S03 of curing of the UV curable adhesive layer 27 is conducted by allowing the UV light source 4 to irradiate the convex surface 281 with a total energy of $2500\pm2000$ mj/cm$^2$. In another embodiment of the method of the disclosure, the curing of the UV curable adhesive layer 27 may be performed in cooperation with two of the UV light sources 4, one of which is used for irradiating the convex surface 281 and the other one (not shown) of which is used for irradiating the concave surface 282 so as to enhance the curing efficiency and quality of the UV curable adhesive layer 27.

In this embodiment, the method of making the curved electrochromic film 1 is carried out in cooperation with the forming apparatus 3 provided with a single power source, i.e., the power source 323 for driving the first bending member 321 to move toward the fixed second bending member 322 to arch the electrochromic film semi-product 1'. In another embodiment, the forming apparatus 3 may include two of the power sources 323, which respectively drive the first and second bending members 321, 322 to be moved toward each other along the directions that are parallel to the direction in which the electrochromic film semi-product 1' lies between the first and second bending members 321, 322. Hence, the time required for arching the electrochromic film semi-product 1' can be reduced. Besides, the structure and number of the confining groove 315 are not limited as long as the first and second bending members 321, 322 can be moved toward each other along a predetermined direction. Arrangement of the reverse-bending resistance portion 312 of the base 31 contributes to permitting the electrochromic film semi-product 1' to arch in a desired direction, which is away from the reverse-bending resistance portion 312. In another embodiment, when the base plate 311 is formed with a flat surface that is adapted to be provided with the first and second bending members 321, 322 and to support the electrochromic film semi-product 1', the base 31 may not include the reverse-bending resistance portion 312.

The subsequent processes of the embodiment of the method of making the curved electrochromic film 1 may include cutting, electrode forming, activation, cleaning, etc. Since the subsequent processes are known to those skilled in the art, further details thereof are not provided herein for the sake of brevity.

Figure 4:
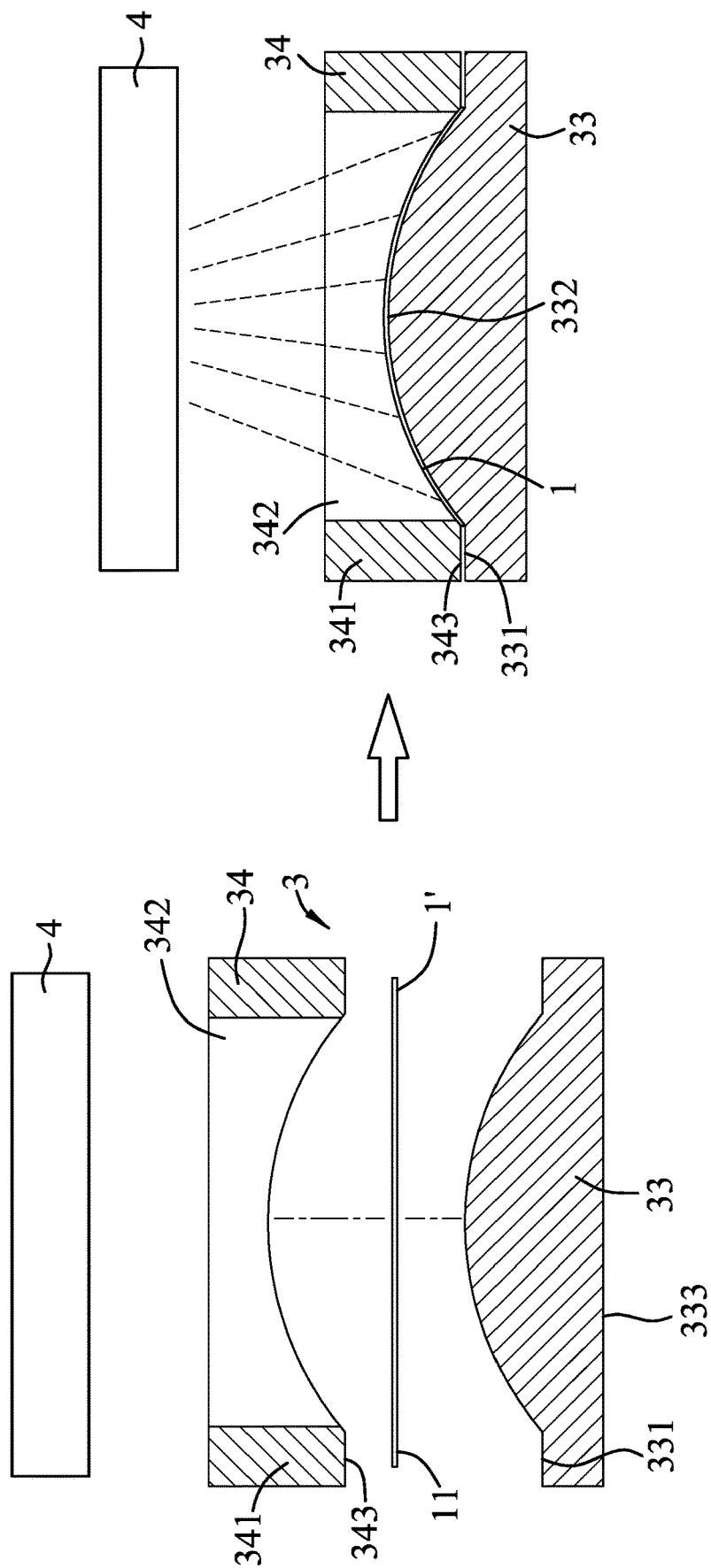
FIG. 4 is a schematic view illustrating arching and curing of the electrochromic film semi-product of the embodiment of the method of making a curved electrochromic film in cooperation with a second embodiment of a forming apparatus.
Figure 5:
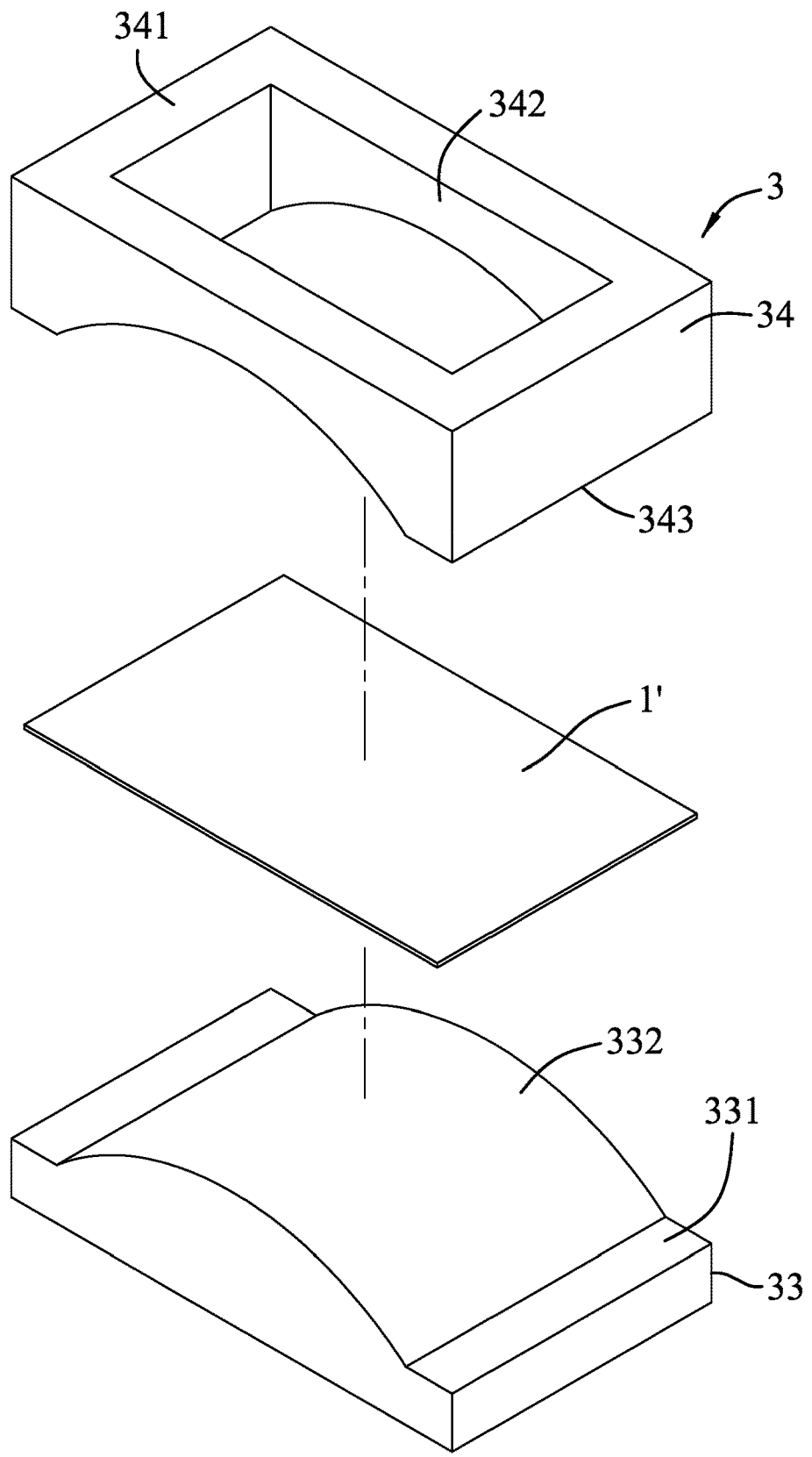
FIG. 5 is an exploded perspective view illustrating the second embodiment of the forming apparatus of FIG. 4.

Referring to FIGS. 4 and 5, the method of making the curved electrochromic film 1 is illustrated to be in cooperation with a second embodiment of the forming apparatus 3. The second embodiment of the forming apparatus 3 includes a first bending member 33 and a second bending member 34. The second bending member 34 is spaced apart from the first bending member 33 so as to allow the electrochromic film semi-product 1' to be disposed therebetween. The second bending member 34 is reciprocally movable toward and away from the first bending member 33 along directions that are perpendicular to a direction in which the electrochromic film semi-product 1' lies between the first and second bending members 33, 34 so as to bend and press the electrochromic film semi-product 1' against the first bending member 33.

To be specific, the first bending member 33 has a top surface 331, a bottom surface 333 opposite to the top surface 331, and a convex surface 332 that protrudes from the top surface 331 in a direction away from the bottom surface 333. The second bending member 34 includes an annular frame portion 341 that is rectangular in shape and that is adapted to press a periphery 11 of the electrochromic film semi-product 1' against the first bending member 33 and that confines a through hole 342 corresponding in position to the convex surface 332 of the first bending member 33. The electrochromic film semi-product 1' is arched in a portion that is surrounded by the periphery 11.

More specifically, the annular frame portion 341 is formed with a pressing surface 343 that surrounds the through hole 342 and that corresponds in position to the top surface 331 of the first bending member 33. Therefore, when the annular frame portion 341 of the second bending member 34 presses the electrochromic film semi-product 1' against the first bending member 33, the convex surface 332 faces the second bending member 34 and the pressing surface 343 of the second bending member 34 will be in close proximity to and at least partially attached to the top surface 331 of the first bending member 33 through the electrochromic film semi-product 1'. In addition, the UV light source 4 is disposed over the through hole 342 of the second bending member 34.

When the embodiment of the method of making the curved electrochromic film 1 is carried out in cooperation with the second embodiment of the forming apparatus 3, the second bending member 34 is moved toward the first bending member 33 along the directions that are perpendicular to the direction along which the electrochromic film semi-product lies between the first and second bending members 33, 34. In another embodiment, the first and second bending members 33, 34 may be both driven to be moved toward each other along the directions that are perpendicular to the direction in which the electrochromic film semi-product 1' lies between the first and second bending members 33, 34.

To sum up, by virtue of using the forming apparatuses 3 respectively including the first and second bending members 321, 322 and the first and second bending members 33, 34, the electrochromic film semi-product 1' can be arched while the curing of the UV curable adhesive layer 27 is conducted. Hence, the manufacturing cost of the curved electrochromic film 1 can be reduced, and the processing steps of the method of making the curved electrochromic film can be simplified.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method of making a curved electrochromic film, comprising:

disposing a ultraviolet (UV) curable adhesive layer between a first electrochromic member and a second electrochromic member to form an electrochromic film semi-product in flat form;

arching the electrochromic film semi-product by placing the electrochromic film semi-product between first and second bending members of a forming apparatus and by moving the first and second bending members toward each other; and curing the UV curable adhesive layer using a UV light source, wherein the first and second bending members are moved toward each other along directions that are parallel to a direction along which the electrochromic film semi-product lies between the first and second bending members.

2. The method of claim 1, wherein the curved electrochromic film semi-producthas a convex surface and a concave surface opposite to the convex surface, curing of the UV curable adhesive layer being conducted by allowing the UV light source to irradiate the convex surface with a total energy of $2500 \pm 2000$ mj/cm$^2$.

3. The method of claim 1, wherein, when the first and second bending members are moved toward each other, the first and second bending members respectively push two opposite parts of a periphery of the electrochromic film semi-product toward each other such that the electrochromic film semi-product is arched midway between the two opposite parts.

4. The method of claim 1, wherein, when the first and second bending members are moved toward each other, the second bending member presses a periphery of the electrochromic film semi-product against the first bending member such that the electrochromic film semi-product is arched in a portion surrounded by the periphery.

* * * * *